US005147460A

United States Patent [19]

Otaki

[11] Patent Number: 5,147,460

[45] Date of Patent: Sep. 15, 1992

[54] INTERNAL COATING MATERIALS FOR A CATHODE RAY TUBE

[75] Inventor: Shiro Otaki, Tokyo, Japan

[73] Assignee: Acheson Industries, Inc., Port Huron, Mich.

[21] Appl. No.: 702,749

[22] Filed: May 20, 1991

[30] Foreign Application Priority Data

May 21, 1990 [JP] Japan .................................. 2-130549

[51] Int. Cl.$^{5}$ ...................... C04B 28/20; C04B 14/04; C09C 1/02

[52] U.S. Cl. .................................... 106/626; 106/618; 106/467

[58] Field of Search ............. 106/618, 626, 467, 14.21

[56] References Cited

U.S. PATENT DOCUMENTS

| | | | |
|---|---|---|---|
| 2,951,773 | 9/1960 | Helle et al. | 106/626 |
| 4,085,235 | 4/1978 | Compen | 106/626 |
| 4,741,779 | 5/1988 | Mita et al. | 106/467 |

FOREIGN PATENT DOCUMENTS

| | | | |
|---|---|---|---|
| 3842837 | 6/1990 | Fed. Rep. of Germany | 106/626 |

*Primary Examiner*—Helane Myers
*Assistant Examiner*—David M. Brunsman
*Attorney, Agent, or Firm*—Dinnin & Dunn

[57] ABSTRACT

Internal coating materials for a cathode ray tube which are characterized by the fact that, in order to increase the electric resistivity of the internal coating, synthetic zeolite powder with a primary particle size of 0.5 to 20 microns, and more preferably 1 to 7 microns, is used together with electrically conductive graphite powder.

9 Claims, 3 Drawing Sheets

INTERNAL COATING MATERIALS FOR A CATHODE RAY TUBE

BACKGROUND OF THE INVENTION

This invention broadly relates to internal coating materials for a cathode ray tube which are characterized by the fact that, in order to increase the electric resistivity of the internal coating, synthetic zeolite powder (which is a form of sodium aluminosilicate) with the primary particle size of 0.5 to 20 microns, and more preferably 1 to 7 microns, is used together with electrically conductive graphite powder.

The invention also relates to internal coating materials in which the zeolite powder has been processed, mainly by heating at a temperature of 150° to 1000° C., to remove excess water before incorporation in the coating composition, and more preferably said temperature is from 400° to 1000° C.

This invention also relates to internal coating materials in which all or a part of the sodium ions are substituted with other alkaline and/or alkali earth metal ions.

This invention also relates to internal coating materials in which the pigment ratio of silicate particles to graphite is variable to such an extent that the specific electric resistance of a coating baked at 430° C. could be within the range of 0.05 to 34,000 Ω.cm. Preferably the electric resistance is within the range of about 0.1 to 3000, and most preferably within the range of about 1 to 300 Ω.cm.

This invention also relates to internal coating materials in which a portion of the zeolite is replaced by one or more nonconductive materials such as iron oxide, titanium oxide, chromium oxide, aluminum oxide, silicon oxide and silicon carbide.

DETAILED EXPLANATION

This invention is related to internal coating materials to be applied over cathode ray tubes including TV cathode ray tubes.

Normally an electrically conductive coating is applied on an internal surface of a funnel of a black and white TV (or a color TV) cathode ray tube which is mainly composed of graphite powders and sodium or potassium water glass. This coating serves to accelerate electrons by applying a high electric voltage, to increase the clarity of a color TV by capturing secondary electrons which are generated from a shadow mask etc., and for other functions. Normally the required resistivity is about 0.03 to 0.3 Ω.cm and such a coating is called a normal resistance internal coating. In the area of the color TV, a high resistance internal coating is required and is widely used, which can suppress the peak value of a surge current when an unexpectedly great electric current flows through the internal coating. Normally a specific electric resistance of about 3 to 8 Ω.cm is required.

A stable and non-conductive inorganic pigment is used together with graphite powders to make such an internal coating material. Such pigments are for example titanium oxide, ion oxide, zinc oxide, etc. For instance U.S. Pat. No. 4,272,701 (GTE Products Corporation) explains the relation between the heat of formation and chemical stability of chromium oxide, aluminum oxide and titanium oxide. Various works have also been reported which discussed possibility of using nickel oxide, manganese oxide, magnesium oxide, cobalt oxide and aluminium oxide.

The state of the art is presented in Japan Patents Sho44-22055, Sho52-38713, and Sho63-45428, the disclosures of which are hereby incorporated herein by reference. Reference is also made to commonly assigned copending U.S. patent application Ser. No. 474,472 filed Apr. 2, 1990 (inventor: Shiro Otaki), the disclosure of which is incorporated herein by reference.

PROBLEMS UNDERLYING THE PRESENT INVENTION

No ideal high resistance internal coatings have become available as yet which are satisfactory respecting desired electric resistivity, excellent cohesion, and desired stability. In particular, composing materials come off the coating when certain types of metal oxides are used at the time when an electron gun is inserted into the tube, and when the TV is in use. This undesirable property of a coating is observed in what is referred to as the tape test. The above oxides are relatively thermodynamically unstable being reduced from a normal oxidation state, to a lower oxidation state, resulting in the generation of oxygen followed by the generation of carbon mono-oxide as the result of the reaction of oxygen and graphite powders. It goes without saying these gases deteriorate the degree of vacuum and cause a wasteful consumption of barium. Internal coating dispersions are applied either by brush, sponge, flow or spray coating method and the viscosity prior to the application is critical. The viscosity changes much in the case of some commercially available high resistance internal funnel coating dispersions. The electric resistance of a dry coat of an internal funnel coating is also critical. The electric resistance of some commercially available high resistance internal coatings is quite unstable.

It has been unexpectedly discovered in the present invention that such technical problems can be solved by using internal coating materials for a cathode ray tube which are produced by using the powders of amorphous sodium aluminosilicate (zeolite) with the primary particle size of about 0.5 to about 20 micron, and more preferably about 1 to about 7 micron, together with graphite powders at such a selected pigment ratio that the specific electric resistance of a coat baked at 430° C. would be from 0.05 to 34,000 Ω.cm, and preferably from about 0.1 to about 3000 Ω.cm, and most preferably from about 1 to about 300 Ω.cm.

More preferably the zeolite powder may be processed, mainly by heating at 500° to 1000° C. to remove excess water before incorporation into the coating composition.

Both natural zeolite and synthetic zeolite are available. Natural zeolite consists of aluminum oxide and silicon oxide in the main and contains also one (or more than one) kind of oxide of alkali and/or alkali earth metals as a constituent. It exists in various crystalline structures such as rhombi, monoclinic, and isometric crystals. Synthetic zeolite was extensively studied in the 1940's, for instance by R. M. Barrer, J. Chem. Soc., 2158(1948); and, a vast volume of information is available on it today. Among others, synthetic zeolite A, X, Y and L types, and sometimes 5A type, are being produced on a commercial basis. They are usually produced in a fine powder form having micro-pores with a diameter at a few to several angstroms, and are widely used as molecular sieves. It has ion-exchanging ability and is used in quantity as a softening agent and a flow aid in laundry detergent powders utilizing the aforementioned abilities. An example of such a synthetic zeolite is Toyo Builder powders of Toso Company Limited in Japan.

Synthetic zeolite A, X, Y and L types release moisture at 400° to 700° C. which is trapped in micro-pores. They also lose micro-pores in their structure when they are baked further and lose crystallinity. There are various processes for making such amorphous powders which have no micro-pores. One example is Silton AMT 30 (of Mizusawa Chemicals Company). It is a product which is made of crystalline synthetic zeolite A by a process mainly consisting of heating process. A higher temperature is needed in order of A, X, Y in order to give rise to the above change. These powders begin to stick together when baked at a temperature higher than 900° C. This is called sintering.

Synthetic zeolite A type has a composition $2SiO_2Al_2O_3\ Na_2O\ nH_2O$(n: 2 to 4) and contains water as much as 15%, and is crystalline. However Silton AMT 30 contains water at about 4% and is amorphous. The water or moisture content reduces to about 2% when heated at 600° C., and to about 1.3% when heated at 800° C. That moisture is released when it is heated. However this moisture is not water which is absorbed in silton AMT 30, rather it is a product of the dehydration reaction of two silanol groups.

Silton AMT 30 which is baked at 800° C. for 1 hour is referred to as Silton AMT 30 (A) hereafter. Both normal resistance and high resistance internal coating dispersions were made using Silton AMT 30 (A). They were both found excellent as compared with commercially available normal resistance and high resistance internal coating dispersions respecting stability of dispersion, stability of viscosity, and unchanging quality of a dispersion, to give a constant electric resistance of its dry coat. These dispersions of the present invention were applied on to a glass plate by brush, sponge, spray, flow and dip coating methods. The appearance of the coat was good, that is, the brush traces were diminished for instance. The dry coats were baked at 430° C. for 60 minutes, i.e., an ordinary operating condition employed by a cathode ray tube ("CRT") maker. Both coatings of the two dispersions aforementioned showed excellent properties as compared with commercially available dispersions respecting a tape test which indicates the strength of adhesion among various components of the formulations, and scratch resistance.

A normal resistance and high resistance internal coating dispersions are often applied on a funnel, the latter being applied first near the neck, and then the former being applied near the front overlapping the latter above it. The tape test of the overlapping area was uncomparably better for the set of two dispersions of the present invention, than a set of commercially available two dispersions.

Other materials or chemical compounds comprising silicon:

(1) Synthetic zeolite other than A, X, Y, L and 5A types

Innumerable types of synthetic zeolite are known to exist by any of those other than A, X, Y, L and 5A are not very common.

(2) Synthetic silicate compound particles other than synthetic zeolite

No such particles are identified considering required chemical compositions and the nature and required size distribution.

(3) Natural zeolite or similar minerals containing silicon

Innumerable materials are available but it is difficult to use them when impurities and particle size distribution are taken into consideration. Fractionation is needed in order to obtain a desired particle size distribution. It has been found rather difficult to attain a particle size distribution in range from 0.1 to 10 micron which is the desired range for a pigment to be incorporated in an internal coating. In contrast, a particle size distribution in the range from 1 to 5 micron is obtainable for synthetic zeolite if the reaction condition is carefully controlled during the synthesis as is shown in FIG. 1 (Silton AMT 30).

(4) Particles of other natural silicates

There are innumerable natural silicates but none of those can be used as nonconductive pigment for a CRT internal coating if the impurities and the particle size distribution are taken into consideration. It is practically impossible to obtain a desired narrow particle size distribution.

Particle Size Distribution of Synthetic zeolite

The particle size distribution is a critical factor for a particle to be an ingredient of a CRT internal funnel coating dispersion. Particles of a desired particle size distribution can be obtained if the reaction conditions are properly selected when synthetic zeolite is synthesize. FIG. 1 shows the particle size distribution of aforementioned Silton AMT 30, which is obtained by synthetic zeolite A. The particle shrinks by a few percent when Silton AMT 30 is baked at 500°-900° C., but the baked powders still have a size distribution similar to FIG. 1.

Example of the Production Method of an Internal Coating Dispersion

Internal coatings were produced by the following method.

| Manufacturing method (1) [in weight %]: | Formula | Ex. | Ex. |
|---|---|---|---|
| Natural graphite powders | X | 5.5 | 13.0 |
| Silton AMT 30 (A) [zeolite] | 18.2-X | 12.7 | 5.2 |
| CMC (carboxy methyl cellulose) (thickener) | 1.0 | 1.0 | 1.0 |
| Potassium water glass (solid 28%) [Binder] | 37.7 | 37.7 | 37.7 |
| Deionized water | 43.1 | 43.1 | 43.1 |
| | 100.0 | 100.0 | 100.0 |

The above was charged in a pebble mill and rolled for 15 to 25 hours. X was 5.5% and 13.0% for the formulations cited in this application as high resistance internal coating and normal resistance internal coating dispersions respectively.

| | In Weight % | | | | | | | | | | | |
|---|---|---|---|---|---|---|---|---|---|---|---|---|
| Example No. | 1. | 2. | 3. | 4. | 5. | 6. | 7. | 8. | 9. | 10. | 11. | 12. |
| Natural Graphite Powders | 18.2 | 16.55 | 14.22 | 13.0 | 7.28 | 5.5 | 4.55 | 3.64 | 2.02 | 1.58 | 1.14 | 0 |
| Silton AMT 30(A) | 0 | 1.65 | 3.98 | 5.2 | 10.92 | 12.7 | 13.65 | 14.56 | 16.18 | 16.62 | 17.06 | 18.2 |

-continued

| | In Weight % | | | | | | | | | | | |
|---|---|---|---|---|---|---|---|---|---|---|---|---|
| Example No. | 1. | 2. | 3. | 4. | 5. | 6. | 7. | 8. | 9. | 10. | 11. | 12. |
| (Zeolite) | | | | | | | | | | | | |
| CMC (Thickener) Carboxy Methyl Cellulose | 1.0 | 1.0 | 1.0 | 1.0 | 1.0 | 1.0 | 1.0 | 1.0 | 1.0 | 1.0 | 1.0 | 1.0 |
| Potassium Water Glass (Binder) (Solids 28%) | 37.7 | 37.7 | 37.7 | 37.7 | 37.7 | 37.7 | 37.7 | 37.7 | 37.7 | 37.7 | 37.7 | 37.7 |
| Deionized Water | 43.1 | 43.1 | 43.1 | 43.1 | 43.1 | 43.1 | 43.1 | 43.1 | 43.1 | 43.1 | 43.1 | 43.1 |

(Normal Resistance Internal Coating Dispersion)

| Materials | Chemical Names | Contents (% by weight) |
|---|---|---|
| 09-UF2 | graphite | 13.0 |
| Silton AMT-30HT | zeolite powder | 5.2 |
| Kasil No. 1 | water glass | 37.7 (as solution) |
| Tylose C-1000 | thickener | 1.0 |
| Gum Arabic (H.P.) | dispersant | 1.0 (as 33.3% solution) |
| DI Water | | 42.1 |

1) 09-UF2: Very pure graphite ACBV, Scheemda
2) Silton AMT-30HT: Fired zeolite Mizusawa Chemicals Co. Ltd. Chuo-ku, Tokyo
3) Kasil No. 1: Potassium water glass Philadelphia Quartz Co., U.S.A.
4) Tylose C-1000: CMC Hoechst Aktiengesellschaft Frankfurt (M) 80, FRG
5) Gum Arabic: Natural product

| Materials | Chemical Names | Contents (% by weight) |
|---|---|---|
| 09-UF2 | graphite | 9.92 |
| Silton AMT-30HT | zeolite powder | 3.97 |
| Kasil No. 1 | water glass | 18.39 |
| Tylose C-1000 | thickener | 1.029 |
| Gum Arabic (H.P.) | dispersant | .765 |
| N-Kasil B (20% solid) | water glass | 26.9 |
| DI Water | | 39.11 |
| | | 100.08 |

N-Kasil B: Potassium water glass Tokyo Oka Company, Ltd. Kawasaki City, Kanagawa Pref., Japan The evaluation methods of coating dispersions are as follows.

(1) Viscosity

B type rotational viscometer of Tokyo Keiki Company (2) Tape test

Cello tape No. 405 of Nichiban Company

The coating dispersions are applied on a 6 cm×15 cm glass panel by brush, sponge, etc. The panel is dried at 150° C. for 30 minutes and baked at 430° C. for 1 hour. The tape test is carried out after cooling (to room temperature) by usual technique.

Application Method

The CRT internal funnel coating dispersions of the present invention can be applied either by spray or brush or sponge or flow coating or spray-and-flow techniques.

Experiment Indicating an Excellent Feature of the Invention

Silton AMT 30 contains water at about 1.3% which has been baked even at 850° C. It is not free water or absorbed water, rather it is water generated from the dehydration reaction of two silanol groups. The content of such water increases to 2% when Silton AMT 30 (A) is incorporated in an internal coating dispersion at pH 11 and is kept in stock. The normal practice of manufacturing cathode ray tubes (such as a color TV tube) is to apply an internal funnel coating dispersion to the inside of a funnel, bake it at about 430° C. for 1 hour, continue to bake at a lower temperature under suction for the purpose of combusting organics; and removing water and gaseous materials, and then to seal the neck. The following experiment was carried out to determine if chemically bound water at 2% may or may not cause a technical problem, even after the above baking at 430° C. for 1 hour, evacuating, and sealing processes. It was found that no problem occurred.

FIG. 2-1 and FIG. 2-2 are schematic drawings of internal funnel coatings which are applied on a surface of a funnel. FIG. 2-2 shows a typical internal funnel coating and FIG. 2-1 shows a coating containing Silton AMT 30 (A). An imaginary particle of potassium water glass solid with a diameter similar to Silton AMT 30 (A) is supposed in FIG. 2-2. Both particles are surrounded by potassium water glass solid in the same manner. Thus the question which of these two coatings evolves more moisture after sealing is answered unquestionably by the comparison of which of Silton AMT 30 (A) powders which have been incorporated in a dispersion at pH 11 and stocked in the dispersion and the powders of potassium water glass solid.

Samples of Silton AMT 30 (A) powders which were processed as will be explained later and of powders of potassium water glass (molar ration $SiO_2/K_2O$: 3.9) solid were prepared and the rates of weight loss at 430° C. under nitrogen flow were determined using TGA for 7 hours (FIG. 3).

Sample 1 and 2 shown in FIG. 3 are the powders of processed Silton AMT 30 (A) and the powders of the solid of potassium water glass which were both prepared as will be detailed later. The results are tubulated as follows.

TABLE 1

| | Sample (mg) when air flow was switched to N flow (Point A) | Weight reduction (mg) 7 hours from Point A | Weight reduction (%) |
|---|---|---|---|
| Sample 1 | 29.62 | −0.03 | 0.101 |
| Sample 2 | 27.64 | −0.16 | 0.579 |

The weight of processed Silton AMT 30 (A) powders was reduced only by 0.101% whereas that of the powders of potassium water glass solid was reduced by 0.579%. It is noted that the weight of the latter continues to reduce noticeably even after heating for 4 hours at 430° C. in nitrogen. The weight reduction is due to the evaporation of moisture or the loss of water which is generated from the dehydration of two silanol groups. Potassium silicate powders continue to release moisture as above and yet potassium silicate or potassium water glass has been widely used in the formulations of CRT internal funnel coating dispersions with no technical problems. The moisture release of Sample 1 is about one sixth the powders of potassium water glass under a condition at an elevated temperature more severe than a condition to encounter in an actual sealed tube. Thus it is perfectly safe to use the Silton AMT 30 (A) powders in an internal funnel coating formulation.

Details of the Preparation of the Powders of Processed Silton AMT 30 (A)—Sample 1

Silton AMT 30 (A) powders were dispersed in water at pH 11 and kept standing for 4 days. They were then filtered off, air-dried and then baked at 430° C. for 30 minutes. The above was a simulation of the conditions to be applied to the powders when they were incorporated in a formulation, stored in stock and the dispersion is applied on a funnel, dried and then baked at 430° C. at a CRT manufacturer's plant.

Preparation of the Powders of Potassium Water Glass Solid

Potassium water glass with the solid at 29% was heated at 120° C. and then at 250° C. to evaporate water and the solid was pulverized with a pestle. They were baked at 430° C. for 30 minutes, pulverized by mortar and pestle and stored in a desiccater. An imaginary water glass powder shown in FIG. 2-2 was thus prepared.

Test Method

These powder samples were taken into the sample compartment of a TGA instrument which was preheated at 430° C. The samples were first heated at 430° C. for 30 minutes under an air flow at 8 ml/min., then the air flow was switched to a nitrogen flow at 8 ml/min. The weight reduction was recorded at 430° C. for 7 hours.

Explanation of the Above Experiment

The powders were baked at 430° C. for 1 hour in total prior to the switch to nitrogen flow from air flow. A funnel is coated with internal funnel coating dispersions, and baked at 400° to 450° C. for 1 hour or so in the air in the production, to dry the coatings completely, and to decompose any organics such as a dispersing agent. The above process was simulated in the TGA runs. In the production of a cathode ray tube, a faceplate is fused to a funnel and it is evacuated while heating at a temperature similar to the baking temperature above. Then the tube is sealed. In the present experiment, an air flow was switched to dry nitrogen flow, and the heating was continued at 430° C. This was meant to be an acceleration of the change of a condition taking place while the tube is evacuated at a higher temperature, sealed, and is brought into an extended service life of the tube.

The difference between the conditions of the experiment and of the tube manufacturing process is not a problem, in that the two samples are tested under the same condition which is similar to the tube manufacturing process.

Experiments Showing the Excellent Properties of High Resistance Internal Coating Comprising Silton AMT 30 (A)

EXPERIMENT 1

Stability of Dispersion

A dispersion of a high resistance internal coating is stable when Silton AMT 30 (A) is incorporated as non-conductive pigment. Some of commercially available high resistance internal coating dispersions form a thick layer of solid ingredients on the bottom of a container upon standing for a few to several weeks, and an extensive agitation is needed to redisperse. In contract, the dispersions of the present invention remain in a stable dispersed form for several months. There may be various reasons. The zeta potential of graphite powders is approximately −5 mV in an alkali aqueous medium while that of Silton AMT 30 (A) is as high as −60 to −70 mV which is considerably higher than ordinary glass powders, for example $Na_2O$ mCaO $nSiO_2$ or silica type material whose zeta potential is normally −5 ti −30 mV. It might be that such graphite powders and Silton AMT 30 (A) powders repel each other resulting in a well dispersed product.

EXPERIMENT 2

Stability of Viscosity

Usually, an internal funnel coating dispersion is rolled for 10 to 20 hours prior to application. It is the viscosity at the time of application after rolling that is important. The viscosity of a commercially available (Hitasol Ga354B; Hitachi Powdered Metal Co., Ltd.) high resistance internal coating is 350 cps after rolling shortly after the production but it increases to 520 cps several months later. In contrast the viscosity of a high resistance internal coating of the present invention is 430 cps, 435 cps, 410 cps, 410 cps and 410 cps after rolling, 7 days, 10 days, 20 days, 2 months and 2.5 months after the production respectively. The reason to account for such a high stability of viscosity could be multiple. The repulsion of the two electrically charged particles could be one of the reasons. The specific surface area of Silton AMT 30 (A) is nearly zero as is determined by the BET method utilizing the adsorption of nitrogen gas. It indicates that no superfine particles are included and its surface is extremely smooth. Consequently, adsorption or adhesion of other materials such as a thickener is only limited and apparent diameter, or apparent surface area, does not increase significantly even when the powders are kept in contact with such other materials. It goes without saying that viscosity prior to application is of prime importance when it is applied either by brush, or sponge, or flow or spray coating methods.

EXPERIMENT 3

Reliability of Electric Resistance of a Dry Coat

The high resistance internal coating dispersion of the present invention was kept in stock for over two months. A portion of the dispersion was taken and rolled for 15 hours, shortly after production, 1 month and 2 months after the production. The specific resistance of its dry coat which was applied by brush remained unchanged at 2.8 Ω.cm over two months. In contrast, the resistance of a commercially available high resistance internal coating dispersion (Hitasol GA354B) was 7.5 Ω.cm when a dispersion was tested 2 months after the production. It was as high as 37.5 Ω.cm when a portion of the dispersion was taken 14 months after the production. It dropped to 12.5 Ω.cm 16 months after the production.

EXPERIMENT 4

Tape Test (1) High Resistance Internal Funnel Coating

Tape test is a simple but reliable test to determine how strongly component materials are cohering to each other in a baked coating film structure. The tape test of the high resistance internal funnel coating of the present invention was uncomparably superior to a conventional commercially available high resistance internal funnel coating (Hitasol GA354B) as is shown in FIG. 4. (*a*) and (*d*) in FIG. 4 are results of the tape tests of the commercially available high resistance internal coating and of the high resistance internal funnel coating of the present invention respectively.

(2) Normal resistance internal funnel coating (*c*) and (*f*) in FIG. 4 are the results of the tape tests of a commercially available normal resistance internal funnel coating (Hitasol GA37D) and the normal resistance internal funnel coating of the present invention. The coating of the present invention is superior.

(3) Overlapping Area of High Resistance Internal Funnel Coating and Normal Resistance Internal Funnel Coating A high resistance and a normal resistance internal funnel coating are sometimes applied together in order to attain a desired overall electric resistance. The former is applied near the neck area and the latter is applied in the area near the front covering an anode button. The cohesion of component materials in the overlapping area is not satisfactory in the case of the combination of commercially available two coatings; (*b*) in FIG. 4. In contrast, the tape test of the combination of the two coatings of the present invention is excellent; (*e*) in FIG. 4.

EXPERIMENT 5

Scratch Resistance Test

Fine powders may be released from an internal funnel coating when it is scratched, and they would cause problems in a tube. The scratch resistance test was conducted, using a Tabor scratch resistance tester with a steel needle, on the high resistance internal funnel coating of the present invention and a commercially available high resistance internal funnel coating (GA 354B) both applied on a glass panel by means of brush, sponge and doctor blade and baked at 430° for 1 hour. The load applied to a needle was increased by 10 g and the load applied when the needle first reached the glass panel is tabulated in Table 2. The coating of the present invention was found better in all cases.

TABLE 2

| | Load (g) applied to the needle when the coating was first scratched to glass surface | |
|---|---|---|
| | High resistance internal funnel coating of the present invention | Commercially available high resistance internal funnel coating (GA354B) |
| Brush coated | 70 | 50 |
| Sponge coated | 110 | 50 |
| Doctor blade | 130 | 50 |

EXPERIMENT 6

Pigment ratio (Silton AMT 30 (A)/graphite) vs. electric resistance

The addition amount of a non-conductive pigment is expressed in terms of the pigment ratio, non-conductive pigment/graphite. Dispersions with the pigment ratio zero to infinity were prepared maintaining the total weight of Silton AMT 30 (A) and graphite constant. A dispersion technically satisfactory including the state of dispersion was obtained through-out the range. The baked coatings were also satisfactory including tape test and appearance. It was found the electric resistance could be changed continuously by changing the pigment ratio as is shown in Table 3.

TABLE 3

| Example No. | 1. | 2. | 3. | 4. | 5. | 6. | 7. | 8. | 9. | 10. | 11. | 12. |
|---|---|---|---|---|---|---|---|---|---|---|---|---|
| AMT 30 (A) graphite | 0 | 0.1 | 0.28 | 0.40 | 1.5 | 2.3 | 3.0 | 4.0 | 8.0 | 10.5 | 15 | ∞ |
| Viscosity (c.p.s.) | 130 | 180 | 280 | 390 | 445 | 540 | 543 | 560 | 575 | 580 | 700 | 750 |
| Elec. resistance (Ω · cm) | 0.07 | 0.08 | 0.09 | 0.12 | 1.30 | 2.50 | 3.40 | 7.20 | 8,300 | 10,500 | 34,000 | ∞ |

BRIEF EXPLANATION OF THE FIGURES:

FIG. 2-1 is a schematic illustration of an inner surface of a funnel which is coated with the internal funnel coating of the present invention. FIG. 2-2 is the same which is coated with a conventional internal funnel coating.

In FIG. 2-1 and FIG. 2-2, 1 is an internal surface of a funnel, 2 is an internal coat, 3 is a graphite particle, 4 is powder A, 4' is an imaginary particle of potassium water glass solid, and 5 is a solid matrix of potassium water glass solid surrounding 4 and 4'.

Figure 1:
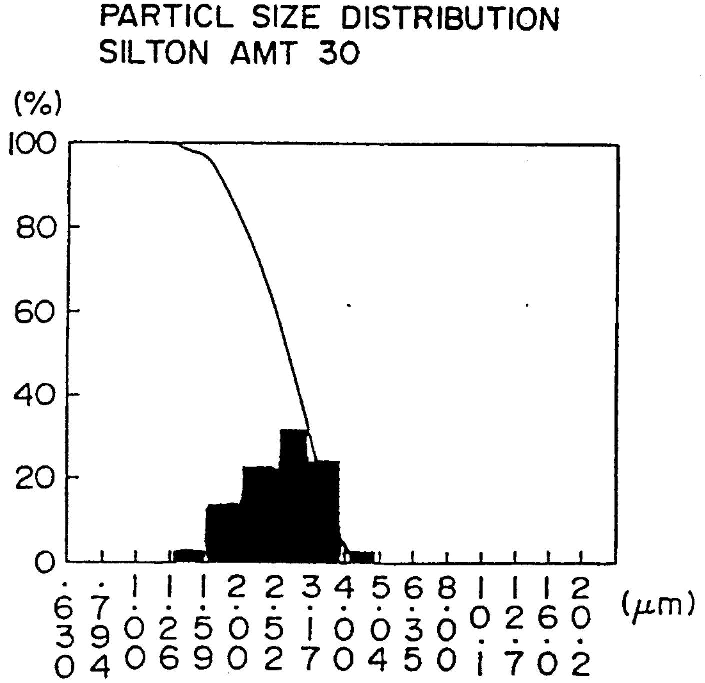
FIG. 1 shows the particle size distribution of synthetic zeolite silton AMT 30 which is the starting material of AMT 30 (A) or one of the major ingredients of the dispersions of the present invention.
Figures 1, 2:
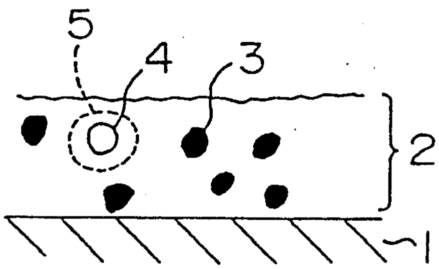
Figure 2:
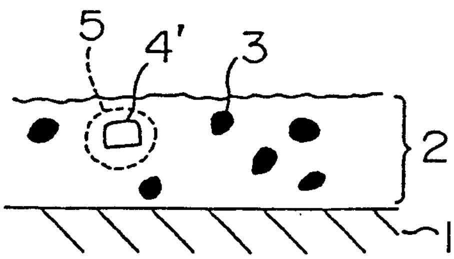
Figure 3:
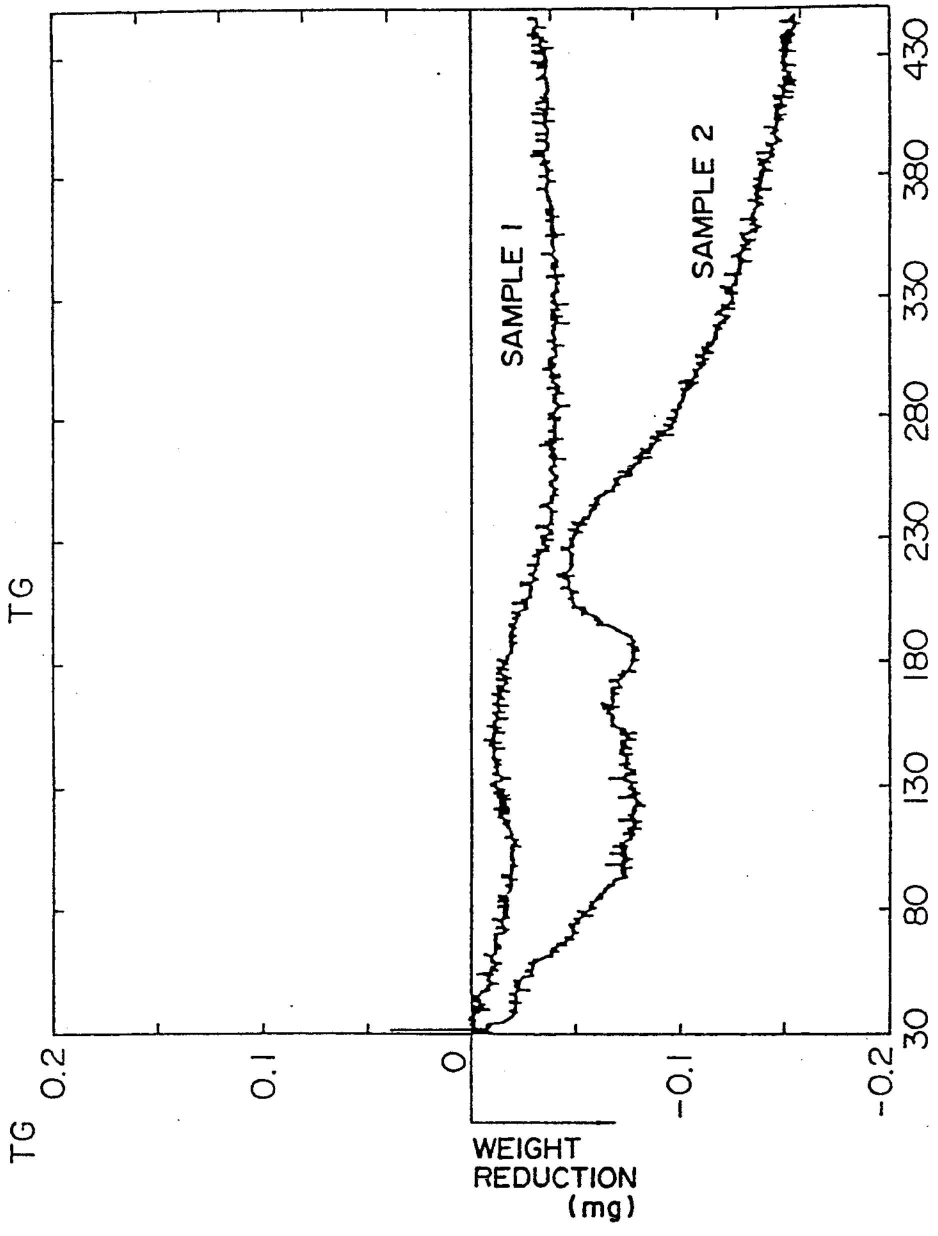
FIG. 3 shows the weight reduction of silton AMT 30 (A) (Sample 1) and the powders of the solid material of potassium water glass (Sample 2) which was determined by use of TGA in a nitrogen flow at 430° C. for 7 hours.
Figure 4:
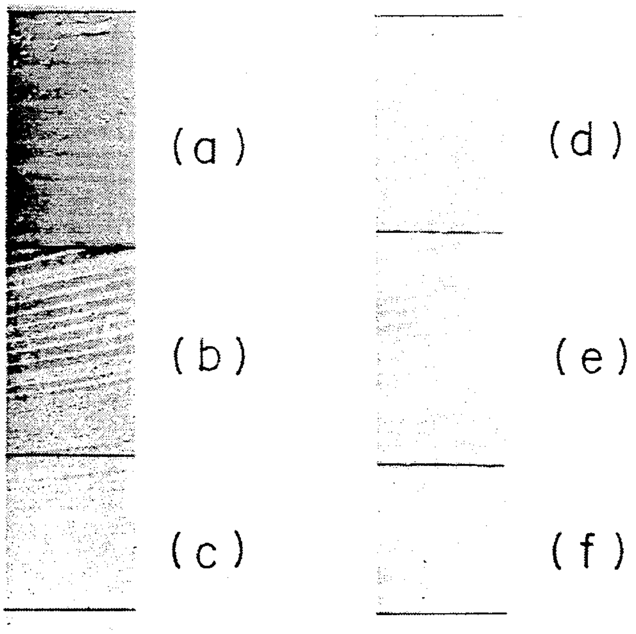
FIG. 4 shows the photographs of the tape tests of the case where two internal funnel coating dispersions of the present invention (*d*), (*e*) and (*f*); and, the case where commercially available two dispersions (*a*), (*b*) and (*c*) were tested.

While it will be apparent that the preferred embodiment(s) of the invention disclosed are well calculated to fulfill the objects, benefits, or advantages of the invention, it will be appreciated that the invention is susceptible to modification, variation and change without departing from the proper scope or fair meaning of the subjoined claims.

What is claimed is:

1. A coating composition for a cathode ray tube, comprising:

zoolite powder, having an average particle size of about 0.5 to about 20 microns, electrically conductive graphite powder, with the pigment ratio of zeolite to graphite being within the range of about 0.1 to 15, an organic thickening agent, water glass, and the balance water, said coating composition having a viscosity within the range of about 150 to about 700 cps.

2. The invention of claim 1 wherein, said zeolite powder has been subjected to heating at a temperature within the range of about 150° C. to about 1000° C. to remove excess water before incorporation in to the coating composition.

3. The invention of claim 2 wherein, said coating composition is applied at a thickness of about 3 to about 50 microns, and provides an electric resistance from about 0.05 to about 34,000 Ω.cm.

4. The invention of claim 3 wherein, said electric resistance is within the range of about 0.1 to about 3000 ohm-cm.

5. The invention of claim 3 wherein, said pigment ratio of zeolite to graphite is within the range of about 0.2 to about 8.

6. The invention of claim 5 wherein, said viscosity is within the range of about 200 to about 600 cps, and the zeolite powder has an average particle size of about 1 to about 7 microns.

7. The invention of claim 6 wherein, all or a part of the sodium ions in the zeolite are substituted with other alkaline and/or alkali earth metal ions.

8. The invention of claim 6 wherein, a portion of the zeolite is replaced with at least one nonconductive material selected from the group consisting of iron oxide, titanium oxide, chromium oxide, aluminum oxide, silicon oxide, and silicon carbide.

9. The invention of claim 6 wherein, said thickening agent is carboxymethyl cellulose, and the water glass is potassium water glass.

* * * * *